(12) United States Patent
Dolbear et al.

(10) Patent No.: US 10,163,460 B1
(45) Date of Patent: Dec. 25, 2018

(54) RESERVATION-BASED MANAGEMENT OF MOVABLE COMPONENTS

(71) Applicant: Oracle International Corporation, Redwood Shores, CA (US)

(72) Inventors: Michael James Dolbear, Boulder, CO (US); Jon Mark Holdman, Wheat Ridge, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/665,344

(22) Filed: Jul. 31, 2017

(51) Int. Cl.
 *G11B 15/68* (2006.01)
(52) U.S. Cl.
 CPC .......... *G11B 15/689* (2013.01); *G11B 15/682* (2013.01); *G11B 15/6885* (2013.01)
(58) Field of Classification Search
 None
 See application file for complete search history.

(56) References Cited

U.S. PATENT DOCUMENTS

| | | | |
|---|---|---|---|
| 5,867,003 A * | 2/1999 | Hashimoto et al. ........................ G11B 15/688 414/276 |
| 5,914,919 A * | 6/1999 | Fosler et al. ....... G11B 15/6835 369/30.31 |
| 6,009,455 A | 12/1999 | Doyle | |
| 6,049,819 A | 4/2000 | Buckle et al. | |
| 6,109,568 A * | 8/2000 | Gilbert et al. ........ B61L 23/005 104/88.03 |
| 6,550,391 B1 * | 4/2003 | Ostwald et al. ... G11B 15/6805 414/273 |
| 6,604,103 B1 | 8/2003 | Wolfe | |
| 6,606,660 B1 | 8/2003 | Bowman-Amuah | |
| 6,698,359 B1 * | 3/2004 | Ostwald et al. ... G11B 15/6835 104/88.02 |
| 6,741,182 B1 * | 5/2004 | Smith et al. ........... G11B 15/68 340/664 |
| 6,810,306 B1 * | 10/2004 | Ostwald ............... G11B 17/225 414/277 |
| 7,480,702 B2 | 1/2009 | Cohn et al. | |
| 8,788,464 B1 | 7/2014 | Lola et al. | |
| 9,432,321 B2 | 8/2016 | Steiner et al. | |
| 2001/0000062 A1 * | 3/2001 | Ostwald et al. ... G11B 15/6835 104/88.02 |
| 2003/0002202 A1 * | 1/2003 | Smith et al. ....... G11B 15/6835 360/92.1 |
| 2003/0002204 A1 * | 1/2003 | Ostwald et al. ... G11B 15/6835 360/92.1 |
| 2004/0141661 A1 | 7/2004 | Hanna et al. | |

(Continued)

*Primary Examiner* — Craig A. Renner
(74) *Attorney, Agent, or Firm* — Invoke

(57) ABSTRACT

Techniques for management of movable devices are disclosed. A system receives a request for an operation associated with a position on a rail. The system selects a component on the rail to execute the operation. The system identifies a rail segment that extends from the component's initial position to the position associated with the operation. The system requests a reservation of that rail segment. If the reservation is obtained, then the system applies electrical signals to move the component along the rails segment to the rail position associated with the operation. The system may also identify one or more other components, physical cells, etc. to reserve, in order to complete the operation.

17 Claims, 14 Drawing Sheets

(56) References Cited

U.S. PATENT DOCUMENTS

| | | | |
|---|---|---|---|
| 2010/0142090 A1* | 6/2010 | Tanaka | G06F 1/182 360/132 |
| 2013/0007245 A1 | 1/2013 | Malik et al. | |
| 2015/0135001 A1 | 5/2015 | Harpaz et al. | |
| 2016/0072755 A1 | 3/2016 | Su et al. | |

* cited by examiner

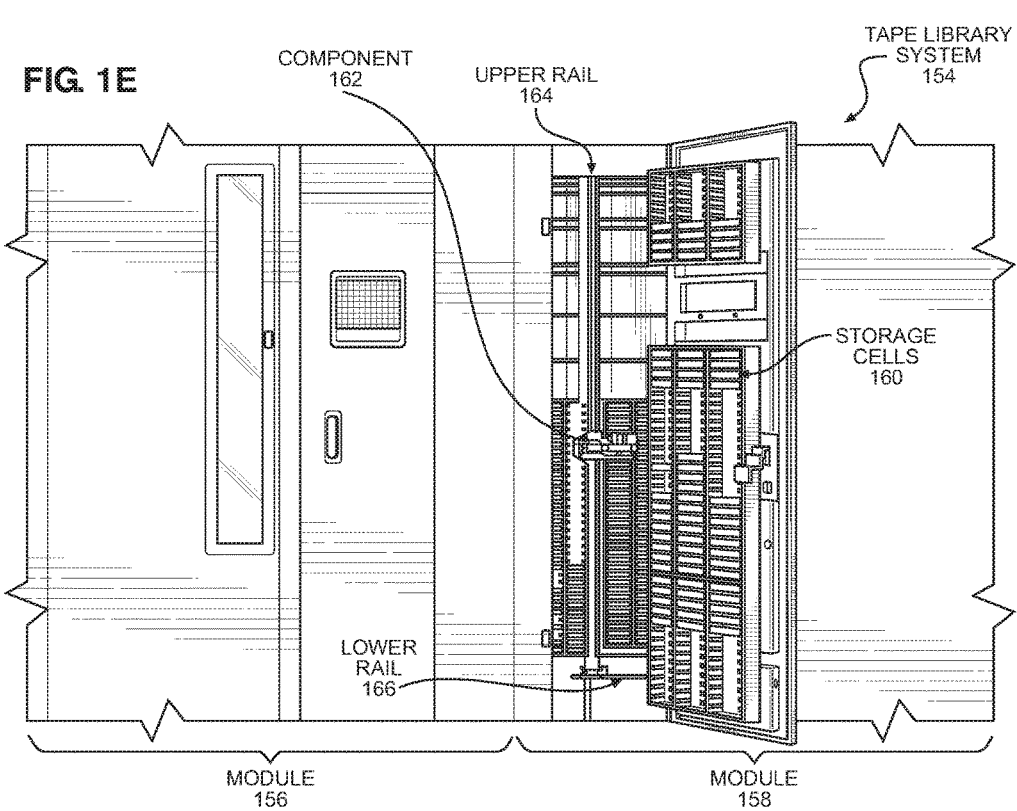

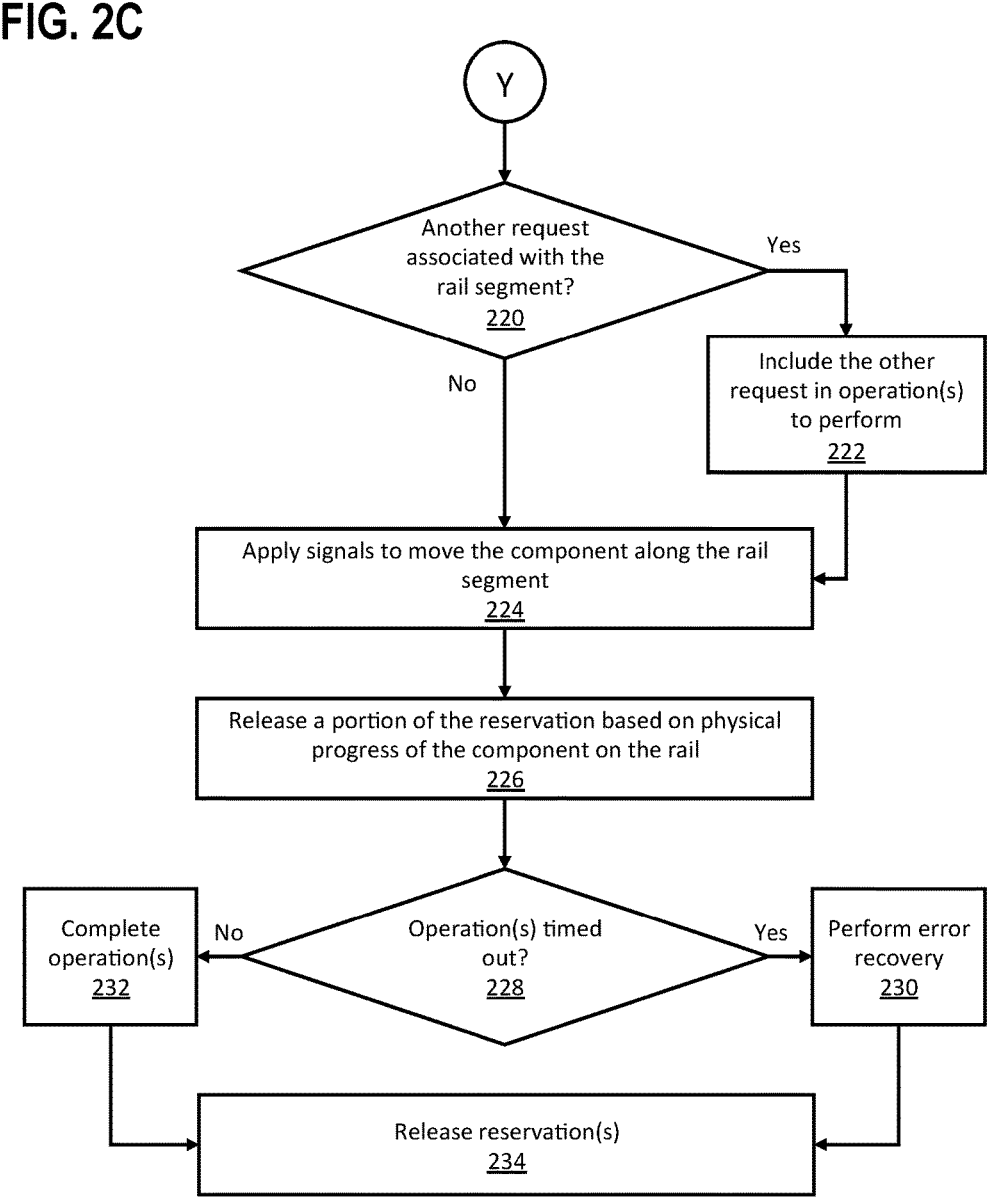

RESERVATION-BASED MANAGEMENT OF MOVABLE COMPONENTS

TECHNICAL FIELD

The present disclosure relates to movable components. In particular, the present disclosure relates to managing movable components.

BACKGROUND

Many different types of mechanical systems include components that are configured to use the same space within the system. For example, in a tape library system (discussed in further detail below), two or more robot arms may be configured to operate along a particular rail. Alternatively or in addition, a system may include one or more impediments to a component's movement, such as a service door that, when opened, occupies space that the component may need to move.

If two components attempt to occupy the same space at the same time, or if a component's path to a particular location is blocked by a physical impediment, a collision may occur. As a result of the collision, the system may be slowed down or even rendered inoperable. The component(s) and/or other impediment(s) may be dislodged or damaged, requiring maintenance that may be time-consuming and/or expensive. A particular component or other impediment may be damaged beyond repair and require replacement. Replacing a component may be expensive in terms of parts and/or labor. Further, the time it takes to restore operation to the system may have operational costs, such as lost revenue if the system provides a revenue-generating service. In general, a collision between a component and another component or other type of impediment is an undesirable occurrence and may even be considered catastrophic.

Some mechanical systems user servomechanisms. A servomechanism (or "servo" for short) is a device or system that receives feedback and adjusts the operation of one or more physical components based on the feedback received. For example, based on feedback received by a servomechanism, the velocity, position, direction, or other operational property of a component may be adjusted. The adjustments are made automatically (i.e., through operation of the servomechanism itself), not manually by a human operator. For example, a human applying pressure to a brake pedal, to decrease the velocity of an automobile, is not a servomechanism. However, the brake pedal may be connected to an antilock braking system that uses a servomechanism to receive feedback (e.g., rotational velocity of the braking tires) and adjusts operation of the braking system accordingly (e.g., by releasing brake pressure to prevent the vehicle from skidding, if the tires stop rotating suddenly).

Many different types of feedback may be used in a servomechanism. For example, for position-based servomechanisms, the physical location of a component may be monitored and compared with an expected location. If there is a difference between the actual location and the expected location, a component may be slowed down or accelerated to compensate for the difference. Similarly, a mechanical governor, also known as a speed limiter, may be used to compare the actual speed of a component with an expected speed and adjust the actual speed accordingly. Servomechanisms also may be used in robotics to control the velocity, position, direction, or other operational property of a robotic component. Those skilled in the art will appreciate that many different types of servomechanisms exist that rely on many different types of feedback.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1E is an illustration of a tape library system in accordance with one embodiment;

FIG. 2A-2C illustrate a set of operations for reservation-based management of movable components in accordance with one embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW AND EXAMPLES
3. RESERVATION-BASED MANAGEMENT OF MOVABLE COMPONENTS
4. ILLUSTRATIVE EXAMPLE
5. MISCELLANEOUS; EXTENSIONS
6. HARDWARE OVERVIEW
7. COMPUTER NETWORKS AND CLOUD NETWORKS

1. General Overview

One or more embodiments allow for reservation-based management of movable components. A system receives a request for an operation associated with a position on a rail (i.e., to be performed at that position or requiring movement of a component past that position). The system selects a component on the rail to execute the operation. The system identifies a rail segment that extends from the component's initial position to the position associated with the operation. The system requests a reservation of that rail segment. If the reservation is obtained, then the system applies electrical signals to move the component along the rails segment to the rail position associated with the operation.

One or more embodiments relate to reservation of both (a) a performing component that is used to execute a target operation and (b) an impeding component that must be moved in order to allow the performing component to complete the target operation. For example, if an impeding component X is occupying space in the rail segment needed by the performing component Y, the system may reserve the impeding component X and an additional rail segment. The system may then apply electrical signals to the impeding component X, to move it out of the way on the additional rail segment.

Further, in one embodiment, if the system identifies an actual or potential impediment to the movement of a component, the system may reserve rail space corresponding to the location of the impediment. Thus, if a request is subsequently received to reserve that segment of the rail, for the component, the reservation is not allowed until the impediment is removed.

One or more embodiments described in this Specification and/or recited in the claims may not be included in this General Overview section.

2. Architectural Overview and Examples

Figure 1A:
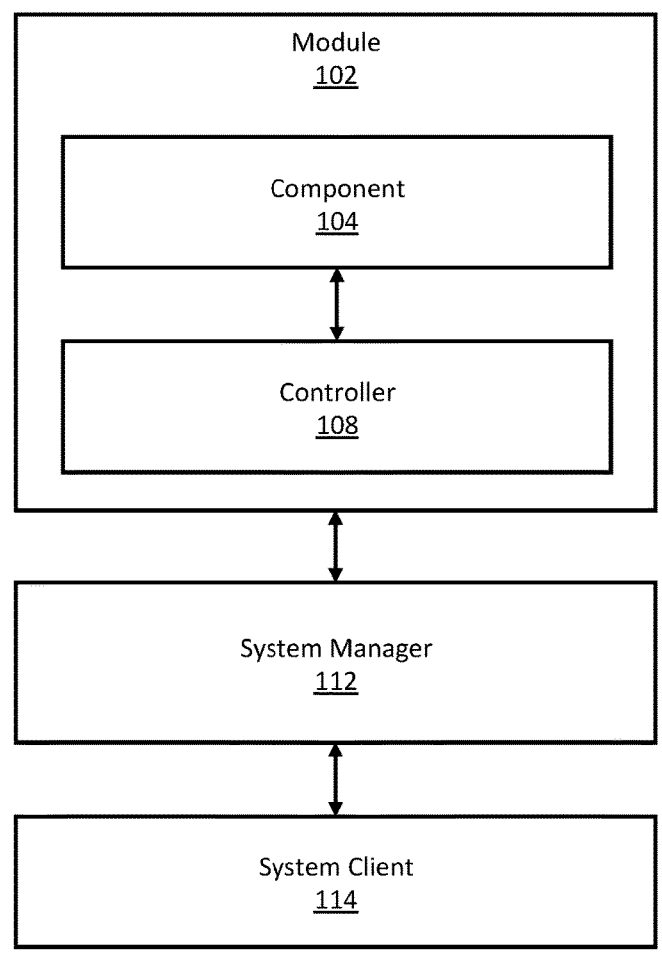
FIG. 1A is a block diagram illustrating a system in accordance with one embodiment.

FIG. 1A illustrates a system 100 in accordance with one or more embodiments. As illustrated in FIG. 1A, system 100 includes a module 102 that includes a component 104 and a corresponding controller 108. The system 100 also includes a system manager 112 and a system client 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 6, titled "Computer Networks and Cloud Networks."

In one embodiment, the module 102 is a physical unit that includes (i.e., physically within or via a physical connection) at least one component 104. The component 104 is a physical device, the operation of which is adjustable by a servomechanism (not shown). For example, the module 102 may be a vending machine, an industrial machine (e.g., operating in a production line, farm, or warehouse), a printer (e.g., an ink printer, laser printer, or 3-dimensional printer), a medical or scientific device (e.g., an automated pill sorter or substrate mixer), a vehicle (e.g., a railway car or self-driving automobile), an entertainment device (e.g., an amusement park ride or arcade machine), a household device (e.g., a vacuum cleaner or kitchen appliance), a digital storage device (e.g., a hard drive or storage library), a network switch, or any other kind of physical unit in which the operation of a component 104 is adjustable by a servomechanism. Those skilled in the art will appreciate that the foregoing list is not exhaustive and is provided merely by way of example.

While FIG. 1A illustrates only one component 104, the module 102 may include more than one component. For example, as discussed below, a storage library may include multiple robotic arms handling the storage devices managed by the storage library. Many different types of modules that include multiple components exist. Further, the module 104 may be combined with other modules (not shown), and/or the module 104 may be a combination of multiple sub-modules. For example, a storage library may include more than one inter-compatible storage library modules.

In one embodiment, the controller 108 is a digital device that helps control operation of the component 104. Specifically, the controller 108 may be configured to apply electrical signals to the component 104, to control the velocity, position, direction, and/or other operational properties of the component 104. If the module 102 includes multiple components, each component may be associated with a separate controller. Alternatively or in addition, multiple components may be associated with the same controller, and/or a single component may be associated with multiple controllers.

In one embodiment, the controller 108 is configured to perform servomechanism operations for the component 104. Specifically, the controller 108 may be configured to receive feedback associated with the component 104 and, based on the feedback, adjust operation of the component 104. The controller 108 may adjust operation of the component 104 by applying new electrical signals to the component 104 and/or modifying electrical signals that are already being applied to the component 104.

In one embodiment, the controller 108 is directly coupled to the component 104 in a manner that causes the controller 108 to physically move with the component 104. For example, a controller for a robotic arm may be directly connected to the arm itself, so that when the arm moves, the controller is carried along with it. Alternatively, the controller 108 may be remotely coupled to the component 104 (e.g., through a network cable) so that the controller 108 does not move with the component 104.

In one embodiment, the system manager 112 is configured to manage operation of the module 102. Specifically, the system manager 112 may issue instructions to the controller 108, which in turn controls operation of the component 104 based on those instructions. For example, in storage library where the component 104 is a robotic arm, the system manager 112 may issue instructions to the controller 108 to remove a particular storage device. Based on those instructions, the controller 108 may apply electrical signals to the component 104 (i.e., the robotic arm in this example) so that the component 104 moves to the location of the storage device in the module 102 and removes the storage device. While the system manager 112 is shown in FIG. 1A as being separate from the module 102, the system manager 112 may itself be a component of the module 102. For example, if the module 102 is a storage library, the system manager 112 may be a server housed in the storage library enclosure.

In one embodiment, the system manager 112 and is configured to perform reservation-based management of components (e.g., component 104) in the module 102. The system manager 112 may include a database or other storage system (not shown), or may be connected to a database or other storage system, in which reservation information is stored. The storage system may also include other state data associated with the components. Alternatively or in addition, some or all of the reservation-based management functionality may be performed by component controllers (e.g., controller 108). Reservation-based management of components is discussed in further detail below.

In one embodiment, the system manager 112 receives instructions from a system client 114. Specifically, the system client 114 may be a computing device operating separately from the module 102 and system manager 112, for which the module 102 provides services. The system client 112 may be a web server or host, such as a server providing cloud-based services for multiple tenants (not shown). Accordingly, the system client 114 may have clients of its own, corresponding to the various tenants. In this example, the module 102 is part of the underlying infrastructure providing cloud-based services for the tenants. Cloud networks are discussed in further detail below. Alternatively or in addition, a system client 114 may be a tenant system or some other type of end user of the module 102. Further, the system 100 may include multiple system managers, and/or the system 100 may include multiple system clients communicatively coupled with each system manager.

In one embodiment, elements of the system 100, such as the controller 108, system manager 112, and/or system client 114, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
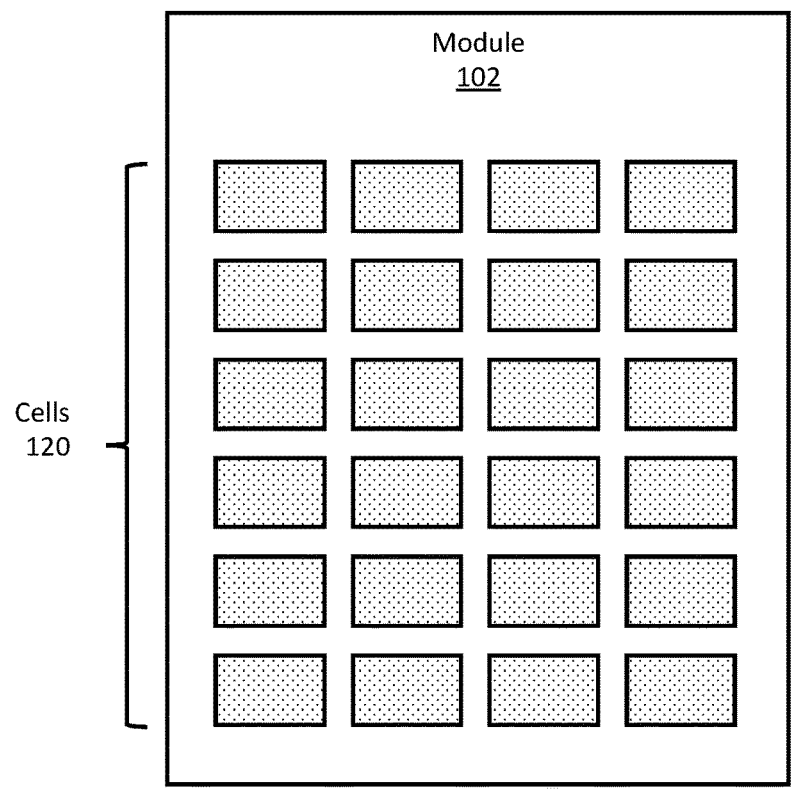
FIGS. 1B and 1C are block diagrams illustrating a module in accordance with one embodiment.

FIG. 1B is a block diagram illustrating a module 102 in accordance with one embodiment. Specifically, FIG. 1B illustrates an abstracted cross-section of a module 102 in accordance with one embodiment. The module 102 includes multiple cells 120 on which components (not shown in FIG. 1B) of the module 102 are configured to operate. In general, referring to FIG. 1B, the term "cells" may refer to a set of similar physical locations in the module 102. For example, if the module 102 is a vending machine, the cells 120 may be so-called "columns" corresponding to particular product selections. If the module 102 is a storage library, the cells 120 may be slots into which storage media (e.g., drives, disks, cartridges, etc.) are inserted. If the module 102 is a network switch, the cells 120 may be physical ports into which cables are inserted. The cells 120 may not be all of the same type. For example, in a storage library, some of the cells 120 may be general-purpose storage cells accepting different types of storage media, while others of the cells 120 may be specific types of storage cells accepting only a particular type of storage media, such as tape cartridges. Many different types of modules exist having different kinds of cells.

In one embodiment, the module 102 includes components in addition to cells or other than cells. In general, the module 102 may include many different types of electronic components, such as a power supply, network connection, sensors, display, storage device, service port, and/or any other type of appropriate electronic component depending on the specific type of module 102.

Figure 1C:
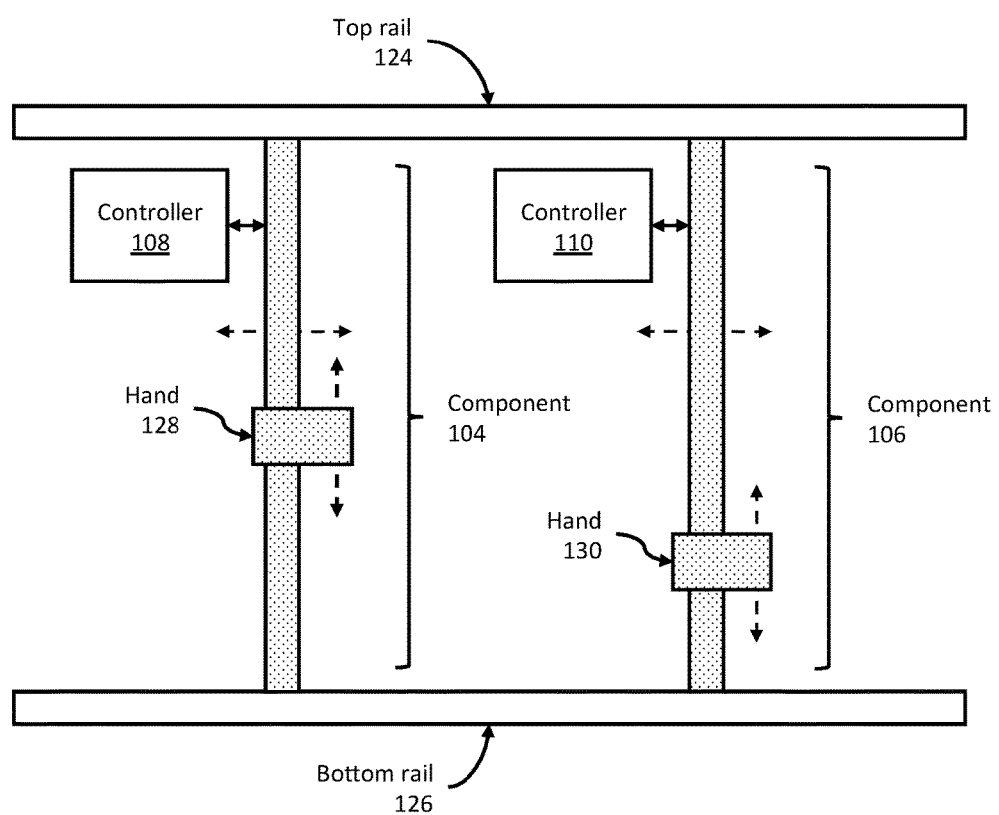

For example, FIG. 1C is a block diagram illustrating a module 102 in accordance with one embodiment. As illustrated in FIG. 1C, the module 102 includes two components 104, 106 operating along a top rail 124 and a bottom rail 126. As used here, the terms "top" and "bottom" are used to differentiate between the rails and may not accurately denote the vertical configuration of the top rail 124 and bottom rail 126 relative to each other. For example, the top rail 124 and bottom rail 126 may be on a same horizontal plane as each other, with FIG. 1C representing an overhead view of the module 102. Many different physical rail configurations may be used. Further, the module 102 may not include any rails, may include more than two rails, or may include only a single rail.

In one embodiment, component 104 has a hand 128 and component 106 has a hand 130. The hands 128, 130 are physical mechanisms used to manipulate other components and/or items in the module 102. For example, the hands 128, 130 may be used to manipulate items placed in cells in the module 102, such as the cells 120 illustrated in FIG. 1B. In one embodiment, the components 104, 106 are configured to follow one axis (e.g., horizontally) along the top rail 124 and bottom rail 126, while the hands 128, 130 are configured to follow another axis (e.g., vertically) along the components 104, 106. In this manner, the hands 128, 130 may be able to reach many different locations within the module 102. Further, if the module 102 has more than one rail, a component may have more than one motor (not shown), with each motor affecting movement of the component along the corresponding rail. In an embodiment, rails in multiple modules and/or sub-modules may be connected, allowing one or more components to move between the modules and/or sub-modules. For example, in a tape library system, robot arms may be able to move from one tape library module to another tape library module, along one or more interconnected rails.

In one embodiment, each of the components 104, 106 has a corresponding controller 108, 110. Each controller is configured to apply electrical signals to its corresponding component, to control movement of the component within the module 102. As illustrated in FIG. 1C, each controller 108, 110 may be directly connected to its corresponding component 104, 106, so that when the component travels along the top rail 124 and bottom rail 126, the corresponding controller moves along with it. Alternatively, one or more of the controllers 108, 110 may be remotely connected to its corresponding component, so the controller does not move with the component.

Figure 1D:
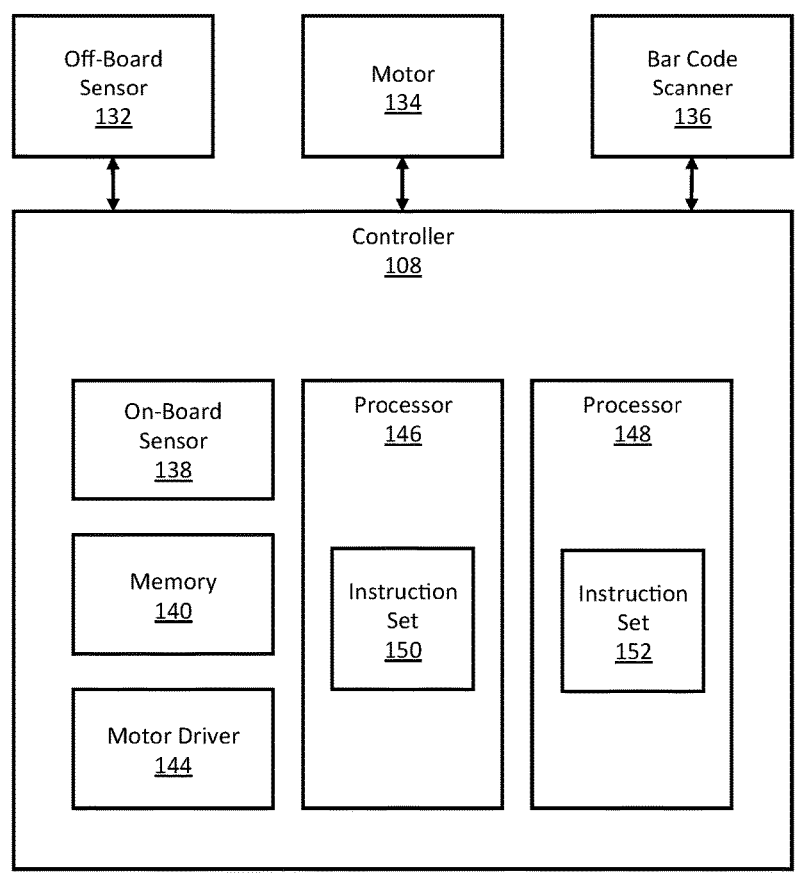
FIG. 1D is a block diagram illustrating a controller in accordance with one embodiment.

FIG. 1D is a block diagram illustrating a controller 108 in accordance with one or more embodiments. The controller 108 is configured to control the operation of a component (not shown) in a module (not shown). The controller 108 may be a logic board, server, or any other type of computing structure or device suitable to perform controller operations described herein.

In one embodiment, the controller 108 includes one or more processors. As illustrated in FIG. 1D, the controller 108 includes two processors; processor 146 and processor 148. Each processor 146, 148 operates using a corresponding instruction set. Specifically, processor 146 uses instruction set 150, and processor 148 uses instruction set 152. The processors 146, 148 may be of the same type or may be of different types. For example, processor 146 may use a general purpose instruction set 150 and processor 148 may use a specialized instruction set 152. In one embodiment, the specialized instruction set 152 includes floating point operations that allow processor 148 to perform mathematical functions for a servomechanism more rapidly than processor 146 would be able to perform those same mathematical functions using the general purpose instruction set 150. For example, a general-purpose processor may be an Advanced RISC Machines (ARM) processor based on the Reduced Instruction Set Computer (RISC) design and the other processor may be a Digital Signal Processing (DSP) processor optimized for digital signal processing including floating point operations. Specifically, the DSP processor may be optimized for measuring, filtering, and/or compressing digital or analog signals, which may involve performing complex mathematical calculations. Performing those calculations quickly may help avoid performance concerns associated with latency and/or offload mathematical calculations from the general purpose processor. The DSP processor may also include fewer transistors and/or use less power than the general-purpose processor. In one embodiment, a general-purpose processor executes instructions relating to high-level commands and general system operations, while a specialized processor handles complex mathematical functions.

In one embodiment, the controller 108 also includes one or more non-transitory computer readable media, such as memory 140 and/or some other type of medium, for storing instructions and/or data used by the one or more processors 146, 148 to perform servomechanism operations. The one or more computer readable media may include executable instructions corresponding to one or more operating systems used by the processor(s), such as a LINUX operating system and/or a reduced kernel of an operating system.

In one embodiment, the controller 108 receives feedback about the operation of the component. The feedback may be used as input to servomechanism operations. For example, the controller 108 may receive feedback from one or more off-board sensors 132. As used here, the term "off-board" means that an off-board sensor 132 is communicatively coupled with the controller 108 but is not part of the controller 108 itself. For example, the off-board sensor 132 may be a sensor physically attached or communicating with the component, such as a thermometer, tachometer, tilt sensor, current sensor, or any other kind of sensor configured to receive feedback about the operation of the component and provide the feedback to the controller 108.

Alternatively or in addition, the controller 108 may include one or more on-board sensors 138. As used here, the term "on-board" means that the on-board sensor 138 is part of the controller 108 itself. For example, if the controller 108 is a logic board, the on-board sensor 138 may be attached to the same logic board. The on-board sensor 138 may be a thermometer, tachometer, tilt sensor, current sensor, or any other kind of sensor configured to receive feedback about the operation of the component.

In one embodiment, the controller 108 is configured to apply electrical signals to the component, to modify the component's operation. For example, the controller 108 may include a motor driver 144 configured to transmit electrical signals to a motor 134 that causes the component to move. The particular electrical signals transmitted from the motor driver 144 to the motor 134 may help determine how the component moves (i.e., direction, speed, etc.). Further, the component may include more than one motor 134, and a combination of electrical signals to the various motors may help determine how the component moves. A motor driver 144 may be configured to transmit electrical signals to a single motor 134, or to multiple motors. For a component with more than one motor (for example, a component operating along more than one rail), more than one motor driver may be used.

In an embodiment, the controller 108 uses a motor 134 and off-board sensor 132 to perform servomechanism functions as follows. One or more processes executed by the controller 108 apply a voltage and/or current to a motor 134. An off-board sensor 132 (e.g., an encoder) provides feedback about the actual motion of the motor 134. The controller 108 uses the feedback to adjust the voltage and/or current applied to the motor 134. Adjusting the voltage and/or current in response to the feedback allows the controller 108 to achieve (or more closely approximate) the desired motion of the component being moved by the motor 134.

In one embodiment, the controller 108 is configured to control and receive feedback from various parts of the component, some of which may not be related to servomechanism operations. For example, the controller 108 may be configured to transmit electrical signals to, and receive electrical signals from, a bar code scanner 136. The bar code scanner 136 may be configured to read bar codes of items manipulated by the component within a module. For example, a hand 128 as illustrated in FIG. 1C may include a bar code reader. The bar code reader may be used to identify items stored in cells 120 as illustrated in FIG. 1B.

FIG. 1E is an illustration of a tape library system 154 in accordance with one embodiment. In this example, the tape library system 154 includes two modules: module 156 and module 158. The modules are connected along a vertical edge to form a single, modular unit. An upper rail 164 and lower rail 166 run the horizontal length of the tape library system 154, allowing a component 162 to access storage cells 160. Each of the storage cells 160 may be configured to accept tape drives and/or other storage media, as discussed above. In FIG. 1E, the storage cells 160 run the length of the tape library system 154 in both the front and back. The component 162 is a robot arm connected to the upper rail 164 and lower rail 166, allowing the component 162 to move along the rail under power of one or more motors. The component 162 also includes a robot hand, which moves vertically along the robot arm to access storage cells 160 at different heights in the tape library system 154. In one embodiment, the tape library system 154 includes more than one robot arm (not shown).

3. Reservation-Based Management of Movable Devices

Figure 2A:
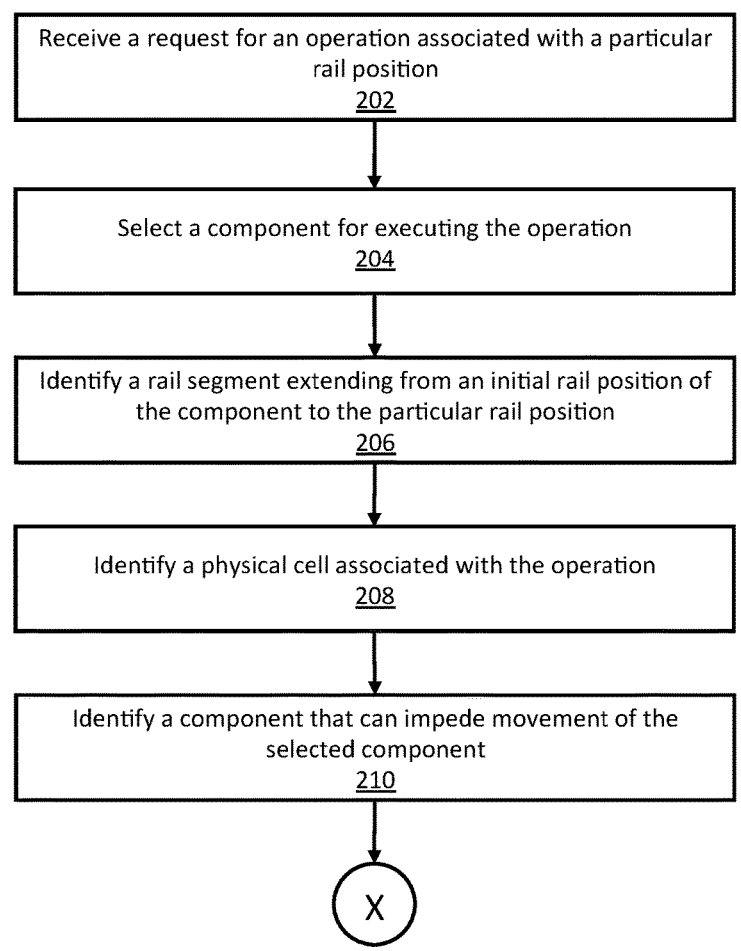
Figure 2B:
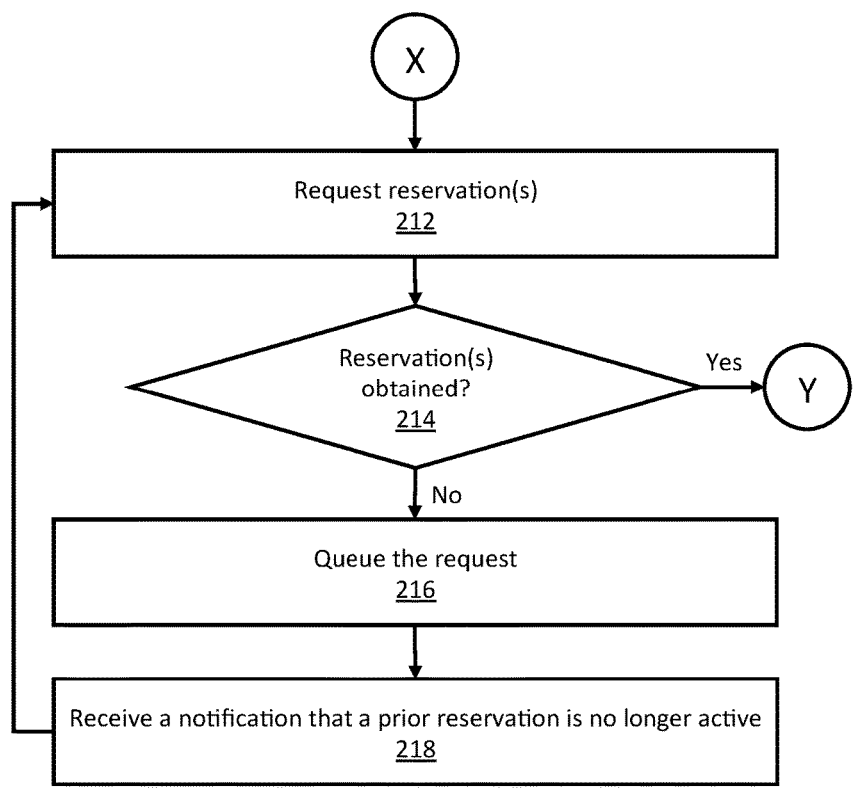

In one embodiment, movable components are managed using a reservation-based process. Specifically, to execute an operation in the module system, one or more rail segments, physical cells, and/or other components associated with an operation are reserved. FIGS. 2A-2C illustrate an example set of operations for reservation-based management of movable components in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments. Further, in the following discussion, a system manager is referred to as performing various functions. However, in an embodiment, some or all of those functions are instead performed by other system component(s), such as a component controller.

In one embodiment, the system manager receives a request for an operation associated with a particular rail position (Operation 202). The request may be to perform an operation at that particular rail position. For example, the request may be to access a cell located, on at least one axis, at that particular rail position. Alternatively, the request may be to perform an operation at a different rail position, but requiring that the component pass through the particular rail position. In general, an operation may be said to be associated with a particular rail position if the component must physically reach that particular rail position to complete the operation, whether or not the component comes to rest at that particular rail position.

In one embodiment, the system manager selects a component for executing the operation (Operation 204). This component may be thought of as a "performing component." Many different types of criteria may be used to select a particular component to execute an operation. For example, in a system using robot arms, the system manager may determine that the path for one robot arm to execute the operation is blocked by an open service door, while the path for another robot arm to execute the operation is not blocked. In this example, the system manager may select, as a performing component, the robot arm with a clear path to execute the operation. As another example, the system manager may select, as a performing component, a component having closest physical proximity to the particular rail position. As another example, the system manager may select, as a performing component, a component that has been used less frequently than another component, in an effort to avoid overusing the other component (e.g., to avoid overheating, or in an effort to equalize physical wear across multiple components). As another example, a component may be selected as a performing component based on performance characteristics, where the component that is likely to perform the operation more quickly is selected. As another example, a component may be selected as a performing component based on its ability to execute the operation successfully, if different components do not have the same operational abilities. As another example, a component may be selected as a performing component at random from a pool of available components. Many different criteria and/or combinations of criteria may be used to select a component to execute an operation.

In one embodiment, having selected a performing component to execute the operation, the system manager identifies a rail segment (Operation 206) that extends from (a) the performing component's initial rail position to (b) the particular rail position with which the operation is associated. This is the rail segment to be reserved as discussed below. A rail segment may be quantized, meaning that its length is defined in terms of certain proscribed boundaries, or multiples thereof. For example, a rail segment may be required to have a length measured as a multiple of a predefined unit, where the predefined unit is a particular number of millimeters, centimeters, inches, feet, etc. As another example, the length of a rail segment may be bounded based on physical properties of the rail, such as connector joints. Alternatively, a rail segment may be any length from the minimum distance the performing component is capable of moving to the maximum length the performing component can travel along the rail.

In one embodiment, in addition to a rail segment, other components of the module system may be reserved. The system manager may identify a physical cell associated with the operation (Operation 208). For example, if an operation in a tape library system involves accessing a particular tape cartridge, it may make sense to reserve that tape cartridge, to help ensure that another operation does not attempt to access the tape cartridge at the same time. Alternatively or in addition, the system manager may identify a component that can impede movement of the selected component (Operation 210). This component may be thought of as an "impeding component." For example, in a module system with two robot arms, one robot arm may be able to impede the movement of another robot arm. The impediment may already exist (e.g., if another robot arm is already impeding movement along the rail segment) or may simply be a possibility (e.g., if another robot arm is not already impeding movement along the rail segment, but could potentially do so). As used here, the term "impeding component" may mean a component that is currently an impediment or a component that is potentially an impediment. If an impediment already exists, then executing the operation may involve first removing the impediment, as discussed in further detail below. For example, in a tape library system with two robot arms, one robot arm may be moved out of the way to clear a path on the rail for another robot arm. As discussed in further detail below, removing an impediment may involve reserving an additional segment of the rail, to which the impeding component may be moved.

In one embodiment, the system manager requests reservation(s) of the rail segment, physical cell, and/or other component identified (Operation 212). A reservation may also be requested for the performing component that is to be moved along the rail segment to execute the operation. Reserving the performing component itself may help prevent attempts to use that component for a different operation before the instant operation has been completed. The reservation request may take place within the system manager, i.e., between different software modules executing within the system manager. The system manager may request the reservation at different points in time. For example, the system manager may request the reservation as soon as the rail segment, physical cell, and/or other component have been identified, even if further processing is still required before executing the operation. This reservation approach may be thought of as "pessimistic" because it prevents any other operations from making those reservations, even if further processing is required before actually executing the instant operation. Alternatively, the system manager may not request the corresponding reservation(s) until the system manager initiates execution of the operation. For example, if the system manager uses a state database to manage components, the request(s) may occur when the system manager attempts to commit the operation to the database. This latter approach may be thought of as "optimistic" because it assumes that the identified rail segment, physical cell, and/or other component will still be available for reservation at the time the reservation is actually requested.

In an embodiment, the "optimistic" approach described above may be thought of as analogous to a car intersection where drivers coming from different directions cannot see into the intersection but can query a controller to determine whether the intersection is open. In this analogy, the intersection is analogous to a rail segment, the controller is analogous to the reservation system (e.g., one or more processes executing within the system manager to determine whether a reservation is available and whether to grant a given reservation request), and each different driver is analogous to a different thread handling an operation associated with the rail segment. A particular driver may query the controller to determine that the intersection is empty (i.e., a reservation is available). However, another driver may enter the intersection (i.e., obtain the reservation) after the first driver's query but before the first driver actually attempts to enter the intersection (i.e., attempts to initiate execution of the operation using the rail segment). When the first driver attempts to enter the intersection, the controller denies entry because the intersection is now occupied (i.e., the reservation is no longer available). In this situation, the first driver may be forced to wait until the reservation is available again, as discussed below with respect to queueing operations.

In one embodiment, when a reservation is granted, the system manager stores a record, in a database or other storage system, indicating that the reservation is active. When a reservation becomes inactive, the record may be altered or deleted.

In addition, in one embodiment, requesting reservations includes requesting one or more reservations for an additional rail segment to which an impeding component may be moved. For example, if an impeding component (for example, a robot arm) is occupying space along the rail that is needed to execute an operation by a performing component (for example, another robot arm), the reservation(s) may include a portion of the rail needed to move the impeding component out of the way.

In one embodiment, the system manager determines whether the requested reservation(s) was/were obtained (Operation 214). If a reservation was not obtained—for example, if the reservation is already active for another operation—then the request may be queued (Operation 216). The system manager may subsequently receive a notification that a prior reservation is no longer active (Operation 218). The system manager may then request the reservation(s) (Operation 212) again. Because multiple requests for the same reservation may be queued simultaneously, the system manager may handle queued requests according to various criteria, such as Last In, Last Out (LILO), Last In, First Out (LIFO), priorities associated with each request, service level agreements (SLAs) associate with each request, or any other type of criteria or combination thereof for managing competing operations in a queue. In one embodiment, the queue is managed based on priority first and then FIFO.

In one embodiment, once the request for a reservation is granted, the system manager may determine whether there is another pending request associated with the same rail segment (Operation 220). If so, then the system manager may include the other pending request in the operation(s) to perform (Operation 222). For example, in a tape library system, one operation may involve handling a tape cartridge at point X along a rail, and another operation may involve handling a tape cartridge at point Y along the rail. If point Y is located between the robot arm's initial position on the rail and point X, then the operation at point Y may be performed while the robot arm is in transit to point X. Adding related operations in this manner may increase the efficiency of the module system, minimize the distance a component is required to travel to complete multiple operations (thus potentially increasing the component's operational lifespan by reducing wear and tear), and/or reduce the number of pending operations to be managed. Alternatively, the system manager may not support combining operations in this manner.

In one embodiment, the system manager proceeds to apply signals to move the component along the rail segment (Operation 224). Applying signals to move components is discussed in further detail above, and may involve a servomechanism. Further, if there is an impediment along the rail that needs to be moved out of the way, signals may be applied to move the impediment out of the way, i.e., to a position on the rail where movement of the component executing the operation is no longer impeded.

In one embodiment, the entire reservation remains active (i.e., no other operation can use the entire rail segment) until the operation is fully completed and the reservation is released. Alternatively, the system manager may release a portion of the reservation based on physical progress of the component on the rail (Operation 226). For example, a robot arm's controller may report to the system manager that the robot arm has travelled a certain distance along the rail. The system manager may release so much of the reservation as applies to the portion of the rail segment that the robot arm has already traversed. Freeing up part of a reservation in this manner may improve system performance by reducing the amount of time another operation must wait to use the portion of the rail segment that is no longer needed by the instant operation.

In one embodiment, while an operation is executing, the system manager determines whether the operation has timed out (Operation 228). For example, the system manager may determine whether a controller has failed to report completion of the operation within a predetermined allowable time period. The allowable time period may be a fixed length of time for each operation, or may vary depending on the type and/or complexity of the operation(s) involved. As long as an operation does not time out, the system manager does not interfere with completion of the operation(s) (Operation 232).

In one embodiment, if an operation does time out, then the system manager may perform error recovery (Operation 230). For example, if an operation times out, then the system manager may no longer have accurate information about the component's location along the rail. Thus, error recovery may involve sending a signal to reset the component and return it to an initial position on the rail. The initial position may be the component's position at the start of the operation, or may be a default starting location of the component in the module system. Returning the component to an initial position may also require obtaining a reservation of a rail segment, to help ensure the component does not have a collision while travelling to the initial position. For queue management purposes, operations associated with error recovery may have higher priority than other pending operations. Alternatively, error recovery may involve resetting the module system, so that all components are returned to their initial positions. The system manager may maintain a queue of pending operations, which may include the operation that timed out, and may attempt to initiate those operations again when error recovery is complete.

In one embodiment, when the operation(s) using the selected rail segment is/are complete, the system manager releases the reservation(s) used to execute the operation(s) (Operation 234). Releasing the reservation(s) may involve clearing or modifying one or more entries in a database or other storage system used to track the reservation statuses of different rail segments, physical cells, and/or other components in the module system.

Figure 3:
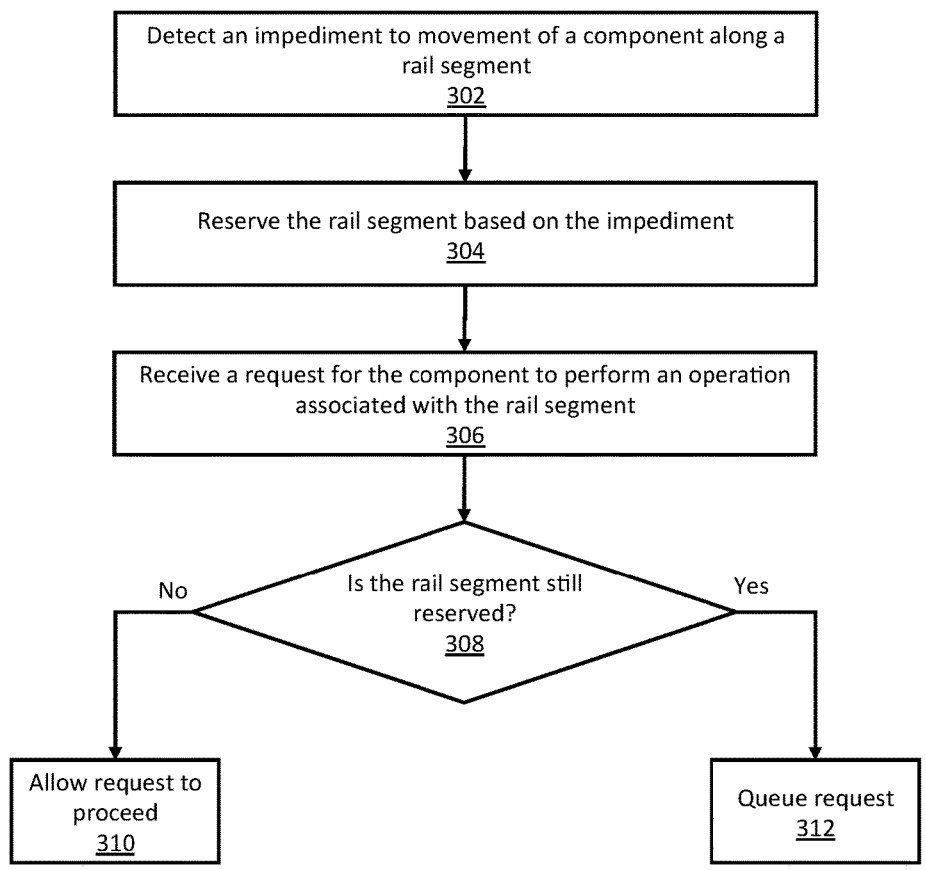
FIG. 3 illustrates a set of operations for reservation-based management of movable components in accordance with one embodiment.

FIG. 3 illustrates an example set of operations for reservation-based management of movable components in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. Further, in the following discussion, a system manager is referred to as performing various functions. However, in an embodiment, some or all of those functions are instead performed by other system component(s), such as a component controller.

As noted above, movement of a component along a rail segment may be impeded, for example by another component, an open service module door, etc. In one embodiment, the system manager detects when there is an impediment to movement of a component along a rail segment (Operation 302). Detecting the impediment may be based on state data stored by the system manager, corresponding to different parts of the module system. For example, when a service module door is opened, an electrical signal may be transmitted to the system manager, and the system manager may accordingly update the door's state to "open." The system manager may predict, based on state data or using some other type of analysis, that the impediment presents a risk of collision between the impediment and one or more other components.

In an embodiment, potential impediments to movement of a component may include: another component; the anticipated path of another component along the rail; a service module door, cartridge, or other component capable of having a "open" or "closed" state; a component that can rotate so that it either impedes the rail or does not impede the rail (for example, a component that, when rotated, blocks the rail but is physically accessible by a service technician);

In one embodiment, when the system manager detects an impediment to movement of a component along a rail segment, the system manager reserves the rail segment based on the impediment (Operation 304). For example, if a service door is opened that overhangs a rail segment, the system manager may reserve that rail segment as long as the service door remains open.

In one embodiment, the system manager subsequently receives a request for the component to perform an operation associated with the rail segment (Operation 306). As discussed in further detail above, performing the operation may require first obtaining a reservation of the rail segment. Accordingly, the system manager determines whether the rail segment is still reserved (Operation 308), i.e., whether use of the rail segment remains prohibited based on the impediment. If the rail segment is still reserved, then either the impediment still exists or the rail segment has been reserved for another operation. Accordingly, the system manager may queue the request (Operation 312). Management of queued requests is discussed in further detail above. However, if the rail segment is no longer reserved, then the request is allowed to proceed (Operation 310).

In one embodiment, using reservations to manage movable components helps avoid collisions. Thus, reservation-based management of movable components may increase system uptime, improve efficiency, reduce operating costs, reduce the amount of maintenance needed, and/or generally avoid system failures or malfunctions.

4. Illustrative Example

FIGS. 4A-4G illustrate an example of reservation-based management of movable components in accordance with one embodiment. This example involves two robots, a rail, two doors, and a cell. However, as discussed above, many different components may be used to perform many different types of operations in many different types of systems. Accordingly, this example should not be construed as limiting one or more embodiments.

In this example, FIGS. 4A-4G illustrate a sequence of events. Beginning with FIG. 4A, robot 402 and robot 404 are situated at different locations along a rail 400. There are also two doors along the rail 400: an open door 408 and a closed door 410. A cell 406 also is situated along the rail 400, referred to as a "target" cell 406 because it is the target of an operation in this example.

Figure 4A:
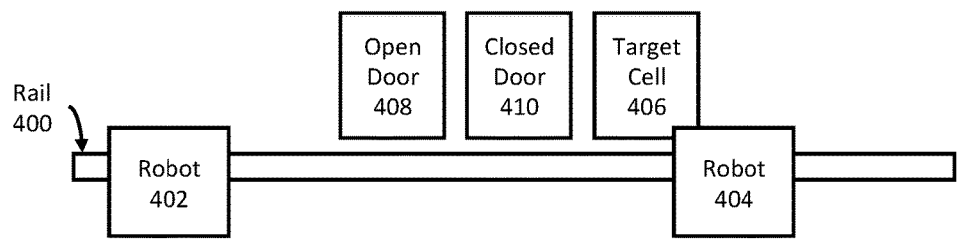
FIGS. 4A-4G illustrate an example of reservation-based management of movable components in accordance with one embodiment.
Figure 4B:
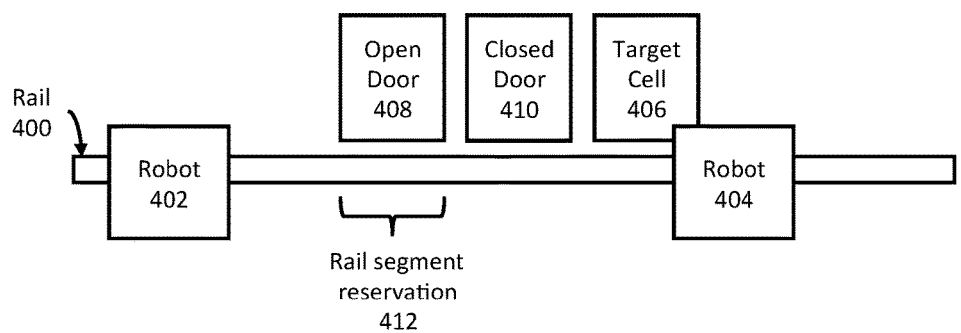
Figure 4C:
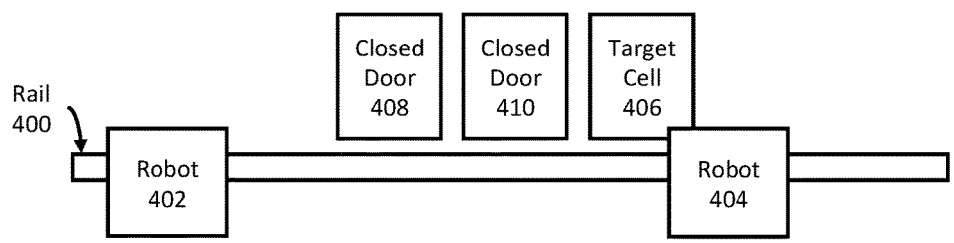

In this example, the open door 408 presents an impediment to movement of either robot 402, 404 along the rail 400. The module system detects the impediment and, as illustrated in FIG. 4B, obtains a rail segment reservation 412 corresponding to the location of the impediment. As long as the rail segment reservation 412 is active, neither robot 402, 404 can attempt to pass the open door 408 along the rail 400. In FIG. 4C, the door 408 is now closed, and the rail segment reservation 412 has been released.

Figure 4D:
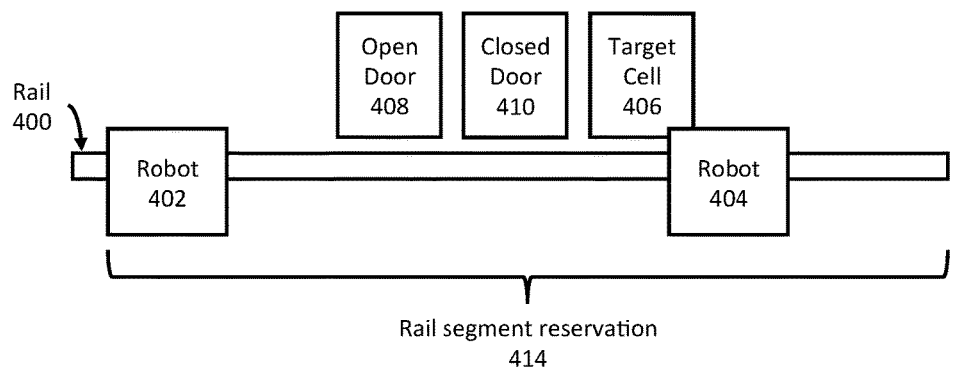

In this example, the system manager has selected robot 402 to execute an operation using the target cell 406. To execute the operation, the robot 402 must travel from its initial position on the rail 400 to the position adjacent to the target cell 406. However, robot 404 is blocking the position adjacent to the target cell 406. Thus, to execute the operation, a reservation is needed not only of the rail segment from the robot's initial position to the target cell, but also an additional rail segment to move robot 404 out of the way. In FIG. 4D, this is illustrated as a single rail segment reservation 414, but it may be two or more separate reservations.

Figure 4E:
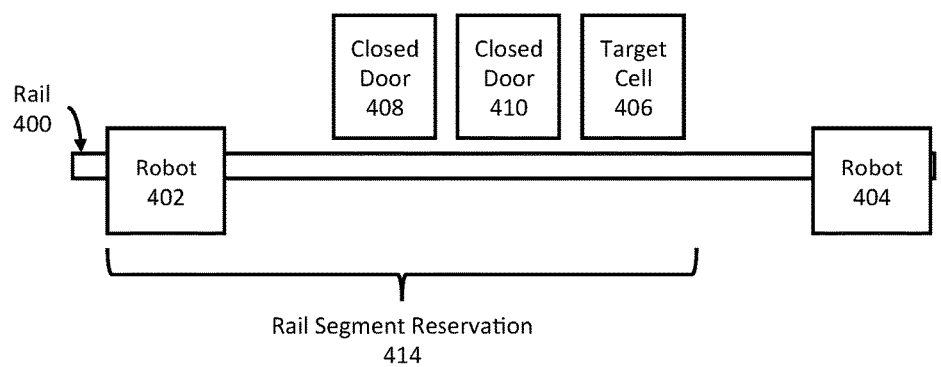
Figure 4F:
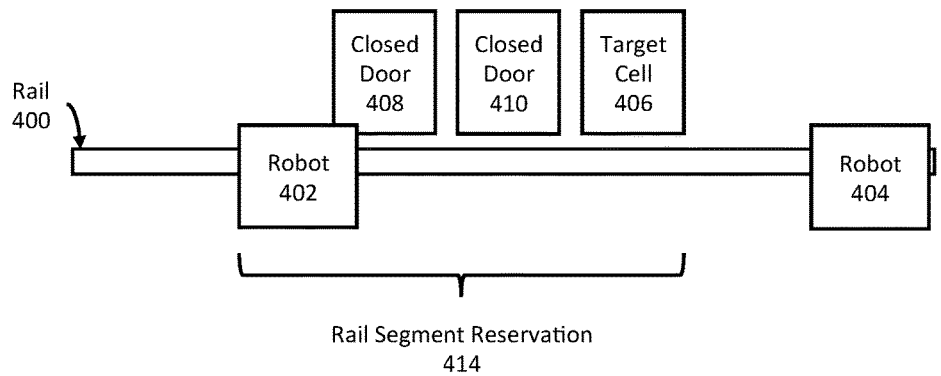
Figure 4G:
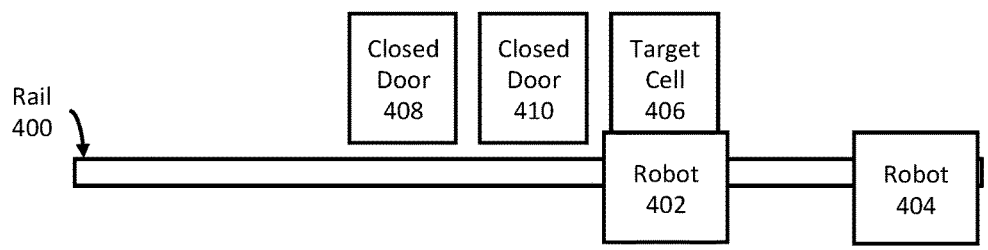

In FIG. 4E, the robot 404 has been moved out of the way, and the portion of the rail segment reservation 414 needed to move robot 404 out of the way has been released. In FIG. 4F, robot 402 has begun moving along the rail 400 toward the target cell. The portion of the rail segment reservation 414 no longer needed to move robot 402 has been released. In FIG. 4G, robot 402 has reached the target cell 406 along the rail and the rail segment reservation 414 has been released entirely. In this manner, the operation at the target cell 406 is successfully executed, while avoiding potential collisions between (a) robot 402 and the open door 408, and (b) robot 402 and robot 404.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
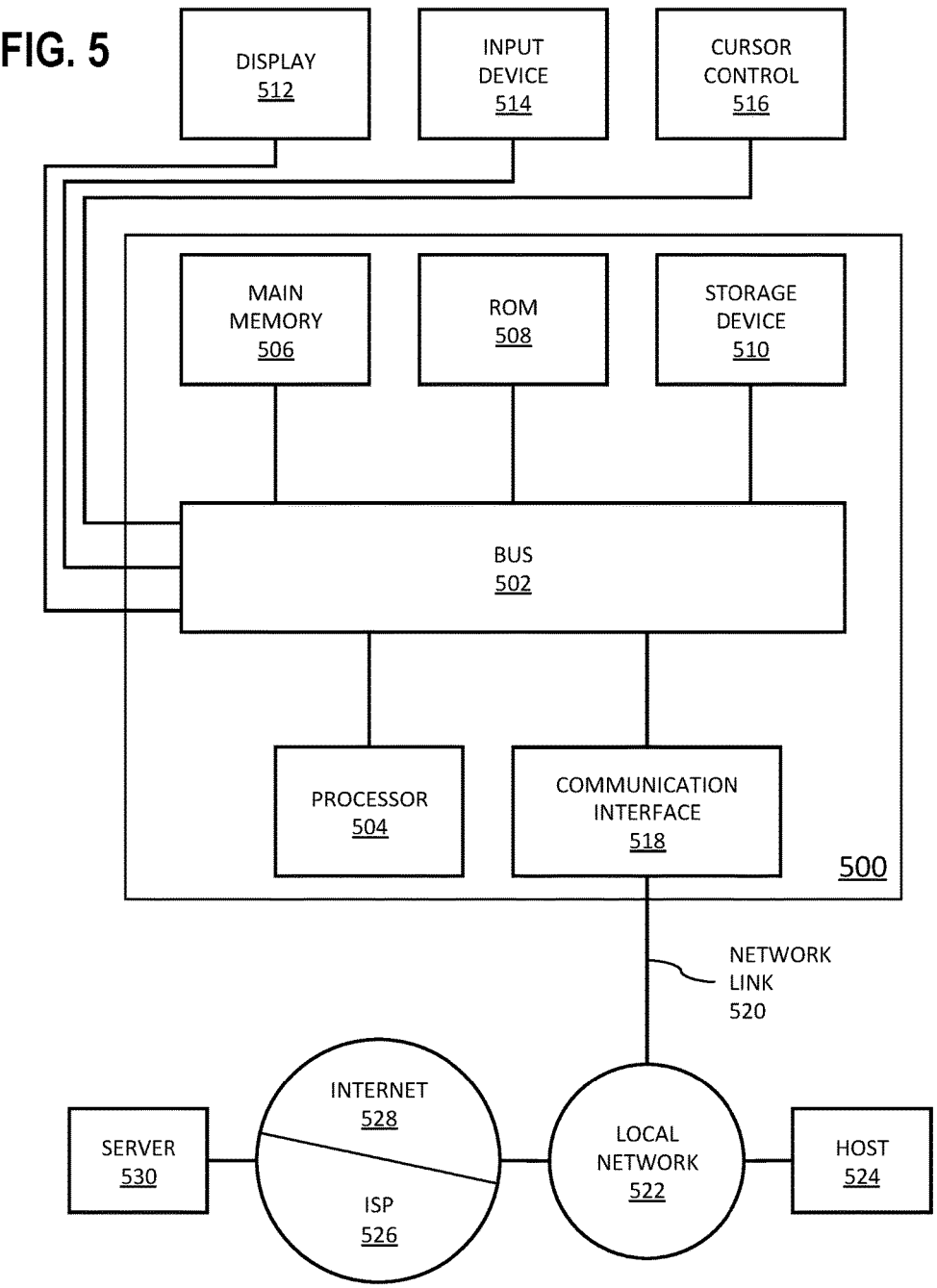
FIG. 5 shows a block diagram illustrating a computer system in accordance with one embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   receiving a first request for a first operation associated at least with a particular rail position on a rail;
   selecting a first component, of a plurality of components on the rail, for execution of the first operation;
   identifying a first rail segment, of the rail, comprising a rail portion from (a) an initial rail position of the first component to (b) the particular rail position;
   requesting and obtaining a first reservation of the first rail segment;
   responsive to obtaining the first reservation of the rail segment, applying a first set of electrical signals to move the first component from the initial rail position to the particular rail position;
   initiating error recovery if the first operation does not complete within a predetermined amount of time.

2. The medium of claim 1, wherein applying the first set of electric signals is further responsive to requesting and obtaining a reservation of the first component.

3. The medium of claim 1, wherein applying the first set of electric signals is further responsive to requesting and obtaining a reservation of a physical cell associated with the first operation.

4. The medium of claim 1, wherein applying the first set of electric signals is further responsive to requesting and obtaining one or more reservations of all components, of the plurality of components, that can impede movement of the first component from the initial rail position to the particular rail position.

5. The medium of claim 1, wherein the operations further comprise:
   determining that a second component, of the plurality of components on the rail, would impede movement of the first component to the particular rail position; and
   responsive to determining that the second component would impede movement of the first component to the particular rail position,
   (a) extending the first reservation to include a second rail segment contiguous with the first rail segment, and
   (b) applying a second set of electric signals to move the second component to the second rail segment.

6. The medium of claim 1, wherein the operations further comprise:
   receiving, while the first reservation of the first rail segment is active, a second request for a second operation associated with the first rail segment;
   requesting and not obtaining a second reservation of the first rail segment;
   responsive to not obtaining the second reservation, queuing the second request for subsequent handling.

7. The medium of claim 1, wherein the operations further comprise:
   receiving a notification that the first reservation of the first rail segment is no longer active; and
   subsequent to receiving the notification, handling a second request for a second operation associated with the first rail segment.

8. The medium of claim 1, wherein requesting the first reservation of the first rail segment is based on a priority level of the first request and a queue position of the first request relative to other requests.

9. The medium of claim 1, wherein selecting the first component comprises determining that the first component would not encounter any physical impediment while moving to the particular rail position.

10. The medium of claim 1, wherein selecting the first component comprises determining proximity of the first component to the particular rail position.

11. The medium of claim 1, wherein the plurality of components comprises at least two robotic mechanical arms operating in overlapping rail space in a tape library system.

12. The medium of claim 1, wherein the first reservation of the first rail segment prevents any other component, of the plurality of components, from using physical space corresponding to the first rail segment while the first reservation is active.

13. A non-transitory computer readable medium comprising instructions which, when executed by one or more hardware processors, cause performance of operations comprising:
receiving a first request for a first operation associated at least with a particular rail position on a rail;
selecting a first component, of a plurality of components on the rail, for execution of the first operation;
identifying a first rail segment, of the rail, comprising a rail portion from (a) an initial rail position of the first component to (b) the particular rail position;
requesting and obtaining a first reservation of the first rail segment;
responsive to obtaining the first reservation of the rail segment, applying a first set of electrical signals to move the first component from the initial rail position to the particular rail position;
identifying a second request for a second operation associated with the first rail segment; and
responsive to identifying the second request, applying a second set of electrical signals to perform the second operation, by the first component, while the first reservation is active.

14. A non-transitory computer readable medium comprising instructions which, when executed by one or more hardware processors, cause performance of operations comprising:
receiving a first request for a first operation associated at least with a particular rail position on a rail;
selecting a first component, of a plurality of components on the rail, for execution of the first operation;
identifying a first rail segment, of the rail, comprising a rail portion from (a) an initial rail position of the first component to (b) the particular rail position;
requesting and obtaining a first reservation of the first rail segment responsive to obtaining the first reservation of the rail segment, applying a first set of electrical signals to move the first component from the initial rail position to the particular rail position;
releasing a portion of the first reservation of the first rail segment based on physical progress of the first component between the initial rail position and the particular rail position.

15. A non-transitory computer readable medium comprising instructions which, when executed by one or more hardware processors, cause performance of operations comprising:
detecting an impediment to movement of a first component, from a plurality of components, along a rail segment of a rail;
obtaining a reservation of the rail segment based on the impediment;
receiving a request for the first component to perform an operation associated with the rail segment; and
rejecting the request based on the reservation,
wherein the impediment comprises a predicted collision between the first component and a second component from the plurality of components,
wherein the second component is a physical service module and detecting the impediment comprises determining that the physical service module is open.

16. A system comprising:
a rail;
a plurality of components on the rail;
one or more hardware processors; and
one or more non-transitory computer-readable media storing instructions, which when executed by the one or more hardware processors, cause execution of operations comprising:
receiving a first request for a first operation associated at least with a particular rail position on the rail;
selecting a first component, of the plurality of components on the rail, for execution of the first operation;
identifying a first rail segment, of the rail, comprising a rail portion from (a) an initial rail position of the first component to (b) the particular rail position;
requesting and obtaining a first reservation of the first rail segment;
responsive to obtaining the first reservation of the rail segment, applying a first set of electrical signals to move the first component from the initial rail position to the particular rail position;
initiating error recovery if the first operation does not complete within a predetermined amount of time.

17. A system comprising:
a rail;
a plurality of components on the rail;
one or more hardware processors; and
one or more non-transitory computer-readable media storing instructions, which when executed by the one or more hardware processors, cause execution of operations comprising:
detecting an impediment to movement of a first component, from the plurality of components, along a rail segment of the rail;
obtaining a reservation of the rail segment based on the impediment;
receiving a request for the first component to perform an operation associated with the rail segment; and
rejecting the request based on the reservation,
wherein the impediment comprises a predicted collision between the first component and a second component from the plurality of components,
wherein the second component is a physical service module and detecting the impediment comprises determining that the physical service module is open.

\* \* \* \* \*

UNITED STATES PATENT AND TRADEMARK OFFICE
CERTIFICATE OF CORRECTION

PATENT NO. : 10,163,460 B1
APPLICATION NO. : 15/665344
DATED : December 25, 2018
INVENTOR(S) : Dolbear et al.

Page 1 of 1

It is certified that error appears in the above-identified patent and that said Letters Patent is hereby corrected as shown below:

In the Specification

In Column 2, Line 26, delete "FIG." and insert -- FIGS. --, therefor.

In Column 2, Line 28, after "embodiment;" delete "and".

In Column 13, Line 18, delete "technician);" and insert -- technician). --, therefor.

In the Claims

In Column 21, Line 56, in Claim 14, after "segment" insert -- ; --.

Signed and Sealed this
Fourteenth Day of January, 2020

Andrei Iancu
*Director of the United States Patent and Trademark Office*